US005810955A

United States Patent [19]

Seifert et al.

[11] Patent Number: 5,810,955

[45] Date of Patent: Sep. 22, 1998

[54] APPARATUS AND METHOD FOR INDEXING CONTAINERS

[75] Inventors: Donald P. Seifert, Tiffin; Lawrence A. Seifert, Perrysburg, both of Ohio

[73] Assignee: Label Masters Technical Services Inc., Northwood, Ohio

[21] Appl. No.: 854,656

[22] Filed: May 12, 1997

Related U.S. Application Data

[63] Continuation of Ser. No. 369,903, Jan. 9, 1995, abandoned.

[51] Int. Cl.[6] .......... B32B 31/00

[52] U.S. Cl. .......... 156/64; 156/362; 156/447; 156/449; 156/567; 198/376; 198/381

[58] Field of Search .......... 156/64, 351, 362, 156/363, 364, 446, 447, 448, 449, 566, 567; 198/375, 376, 379, 381

[56] References Cited

U.S. PATENT DOCUMENTS

| | | | |
|---|---|---|---|
| 3,128,868 | 4/1964 | Bowen | 198/381 |
| 3,269,514 | 8/1966 | Daniels et al. | 198/381 |
| 3,562,050 | 2/1971 | Hake et al. | 156/447 X |
| 3,580,380 | 5/1971 | Phillips | 198/376 |
| 3,983,992 | 10/1976 | Gray et al. | 198/381 |
| 3,988,182 | 10/1976 | Urso et al. | 156/567 X |
| 4,111,153 | 9/1978 | Rohrbach | 118/7 |
| 4,369,214 | 1/1983 | Pfulb et al. | 156/351 X |
| 4,428,474 | 1/1984 | Gau et al. | 198/394 |
| 4,468,277 | 8/1984 | Kontz | 156/567 |
| 4,496,409 | 1/1985 | Kontz | 156/447 X |
| 4,714,515 | 12/1987 | Hoffmann | 156/450 |
| 4,721,544 | 1/1988 | Zodrow et al. | 156/567 X |
| 4,994,135 | 2/1991 | Orlandi | 156/362 |
| 5,028,293 | 7/1991 | Harvey | 156/449 |
| 5,058,724 | 10/1991 | Hinton | 198/376 |
| 5,078,826 | 1/1992 | Rogall | 156/451 |
| 5,108,537 | 4/1992 | Garnes et al. | 156/447 |
| 5,160,570 | 11/1992 | Dickey | 156/448 |
| 5,174,852 | 12/1992 | Zepf | 156/566 |
| 5,201,984 | 4/1993 | Bedin | 156/566 |
| 5,202,932 | 4/1993 | Cambier et al. | 382/8 |
| 5,259,913 | 11/1993 | Stover | 156/566 |
| 5,271,793 | 12/1993 | Seifert et al. | 156/447 X |
| 5,458,728 | 10/1995 | Galchefski | 156/566 |
| 5,478,422 | 12/1995 | Bright et al. | 156/64 |

FOREIGN PATENT DOCUMENTS

| | | |
|---|---|---|
| 3018146 | 11/1981 | Germany . |
| 3543317 | 6/1987 | Germany . |

*Primary Examiner*—David A. Simmons
*Assistant Examiner*—Paul M. Rivard
*Attorney, Agent, or Firm*—John C. Purdue; David C. Purdue

[57] ABSTRACT

Apparatus for orienting containers which have vertical seams is disclosed. The apparatus is useful in label machines where, prior to the application of labels to the containers, the apparatus orients the containers around longitudinal axes, so that the ends of labels applied to such containers are positioned adjacent to the seams. Apparatus according to the preferred embodiment of the invention comprises a star wheel with roller bearings which permit relatively free rotation of containers positioned within the pockets of the star wheel, a container drive wheel movable between a first position where it is operable, and a second position where it is inoperable, to cause rotation of a container which is in a pocket of the star wheel and means for moving the drive wheel between the first and second positions. The apparatus further comprises a sensor operable to detect a container seam and container locking means for stopping and preventing rotation of a container when the drive wheel is moved to the second position. The apparatus further comprises control means for controlling movement of the container drive wheel between the first and second positions and, in some embodiments, for activating and deactivating the container locking means so that containers which enter the star wheel pockets with randomly oriented seams leave the star wheel pocket with seams oriented in a pre-determined angular orientation. The container locking means may comprise a magnet, preferably a permanent magnet or a vacuum mechanism.

13 Claims, 4 Drawing Sheets

APPARATUS AND METHOD FOR INDEXING CONTAINERS

This is a continuation of application Ser. No. 08/369,903, filed Jan. 9, 1995, now abandoned.

BACKGROUND OF THE INVENTION

1. Field of the Invention

The present invention relates generally to the container field and, more specifically, to apparatus for orienting containers, especially prior to the application of a label to the containers. More specifically, the invention relates to an in-line apparatus for rotating a container and for stopping the container from rotating when a seam or other portion of the can reaches a specific, pre-selected angular orientation. This apparatus is especially useful in labelling equipment for containers where it is desired to orient the container relative to a vertical seam or other visually discernable mark on the container, so that the ends of the label align generally with the seam or mark.

2. Description of the Prior Art

The art of labeling equipment is highly developed and the patent literature includes many patents directed to virtually every facet of labeling apparatus and methods. In a patent search directed to the present invention, the following U.S. Pat. Nos. were identified: U.S. Pat. No. 4,111,153 (Rohrbach); U.S. Pat. No. 4,428,474 (Gau et al.); U.S. Pat. No. 4,468,277 (Kontz); U.S. Pat. No. 4,714,515 (Hoffmann); U.S. Pat. No. 4,994,135 (Orlandi); U.S. Pat. No. 5,078,826 (Rogall); U.S. Pat. No. 5,160,570 (Dickey); U.S. Pat. No. 5,174,852 (Zepf); U.S. Pat. No. 5,201,984 (Bedin); U.S. Pat. No. 5,259,913 (Stover) and U.S. Pat. No. 5,271,793 (Seifert et al.). In addition, German Patent Nos. 3,018,146 and 3,543,317 were noted.

The Hoffmann patent discloses a "star wheel 46 having rollers on the ends of the arms that engage and align each container while allowing it to rotate freely. . . " (Column 2, lines 52–54).

The Rogall and Zepf patents disclose labelling machines with sensors to detect the presence of a container in a given location.

The Bedin patent discloses apparatus for orienting containers which include a dimple or a depression.

The Gau et al. patent discloses apparatus for aligning containers in a labeling machine. The apparatus comprises pairs of moveable arms, adjacent container pockets on a star wheel, and a belt carried on the arms. The belt is rotated by a motor which, in turn, causes a container in the star wheel pocket to rotate. A sensor detects marks on the containers and applies a brake to stop rotation of the belts, thereby locking the containers in a pre-determined angular orientation.

The other noted patents appear to be only of general relevance to the present invention.

SUMMARY OF THE INVENTION

The present invention is concerned with apparatus for orienting containers which have vertical seams, prior to the application of labels to the containers, so that the ends of labels applied to such containers are positioned adjacent to the seams. This is especially desirable when the labels to be applied to the containers have transparent or translucent portions. Unless the ends of the labels are consistently aligned with the seams, the seams may register with transparent or translucent portions of the label, creating an unattractive labeled container.

Apparatus according to the preferred embodiment of the invention comprises a star wheel with roller bearings which permit relatively free rotation of containers positioned within the pockets of the star wheel, a container drive wheel movable between a first position where it is operable, and a second position where it is inoperable, to cause rotation of a container which is in a pocket of the star wheel and means for moving the drive wheel between the first and second positions. The apparatus further comprises a sensor operable to detect a container seam and container locking means for stopping and preventing rotation of a container when the drive wheel is moved to the second position. The apparatus further comprises control means for controlling movement of the container drive wheel between the first and second positions and, in some embodiments, for activating and deactivating the container locking means so that containers which enter the star wheel pockets with randomly oriented seams leave the star wheel pocket with seams oriented in a pre-determined angular orientation. In an embodiment particularly adapted for use with magnetic containers, the container locking means comprises a magnet and, preferably, a permanent magnet. In another embodiment, also adapted for use with magnetic containers, the container locking means comprises an electro-magnet. In yet another embodiment, adapted for use with most any container, the container locking means comprises a vacuum mechanism.

Accordingly, it is an object of the present invention to provide an apparatus which is capable of consistently orienting containers along a vertical seam prior to the application thereto of a label.

It is a further object of the invention to provide such an apparatus which can be incorporated into existing labelling stations with a minimum amount of disruption to the components of the labeler.

It is yet another object of the invention to provide such an apparatus which is readily capable of application to containers of various sizes and shapes.

These and other objects and advantages of the present invention will no doubt become apparent to those skilled in the art after having read this detailed description of the invention including the following description of the preferred embodiment which is illustrated by the various drawing figures.

DETAILED DESCRIPTION OF THE PREFERRED EMBODIMENT

Figure 1:
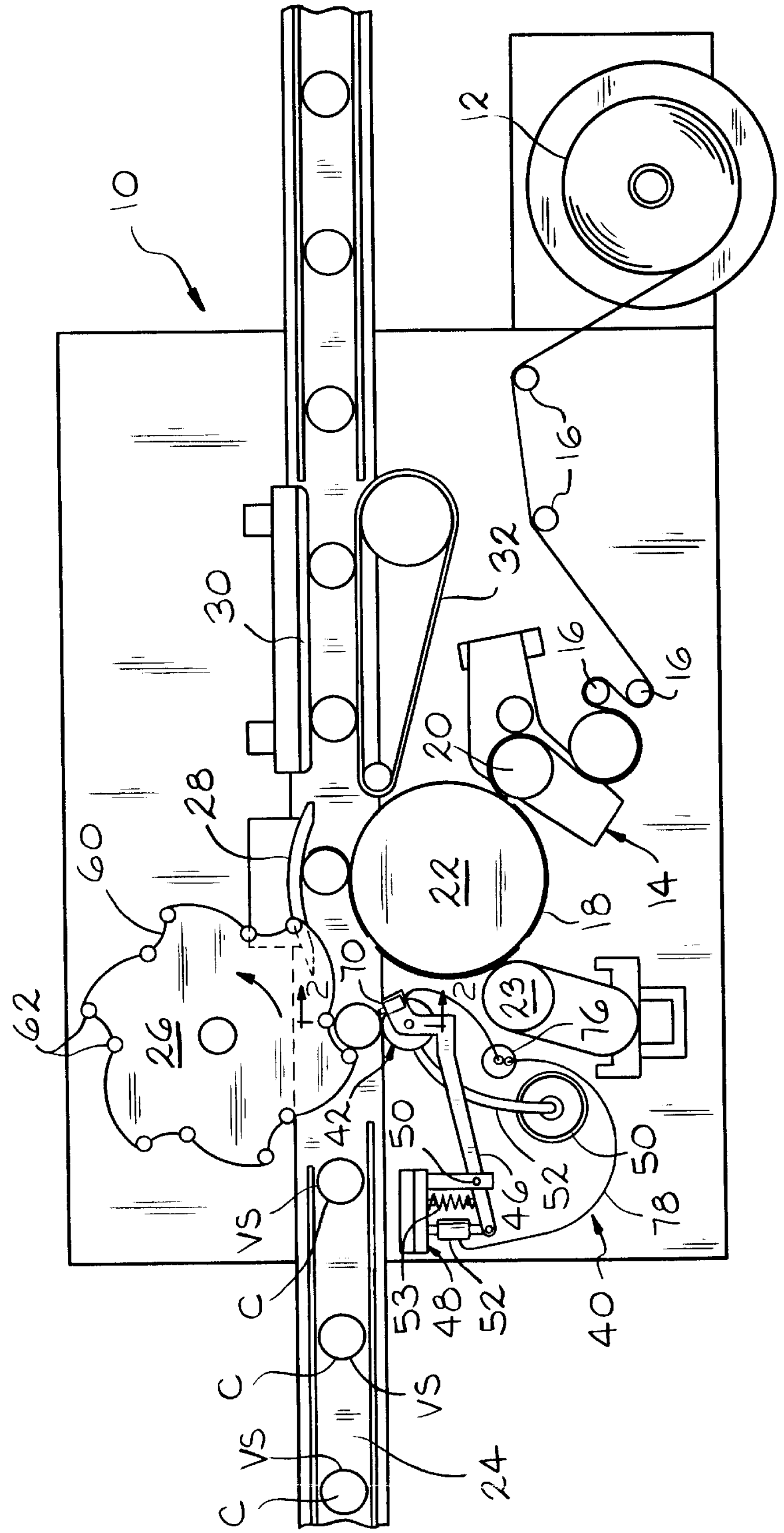
FIG. 1 is a top view of container orienting apparatus according to the present invention.

Referring to FIG. 1, a label applicator station is indicated generally at 10. Labels from a roll 12 are supplied to a label cutter 14, after passing through label guide rollers 16. Cut labels 18 are transferred from a pressure roller 20 on the cutter 14 to a vacuum label drum 22. Adhesive is applied to each label 18 by a glue roller 23. Containers C advance, from left to right in FIG. 1, typically on a conveyor belt 24. First, the containers C individually enter successive pockets of an upper star wheel 26 and a lower star wheel 27 (FIG. 2) which are rotated in the direction indicated by the arrow on the star wheel 26 (FIG. 1). As each container C exits the pockets of the star wheels 26 and 27, it passes between the vacuum label drum 22 and a roll-on pad 28 where an individual label 18 is applied to the container C. A portion of the roll-on pad 28, shown in phantom lines in FIG. 1, "lifts" each container C out of a pocket of the star wheels 26 and 27. Each labeled container C then passes between a second roll-on pad 30 and a roll-on belt 32. The labeled containers C then exit the label applicator station 10. This much of the label applicator station 10 illustrated in FIG. 1 is conventional and will not be described further, except in the context of the present invention.

Figure 4:
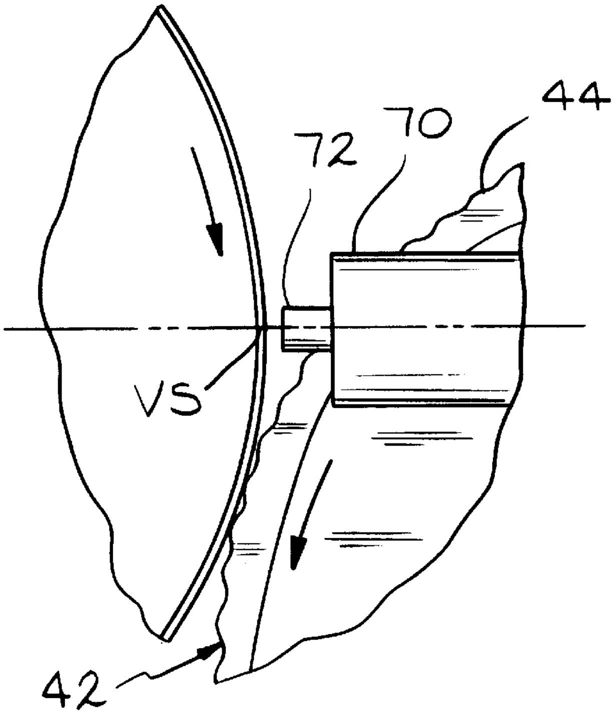
FIG. 4 is a top view of a portion of the container orienting apparatus, during a time when the container is being rotated by the container drive wheel.
Figure 5:
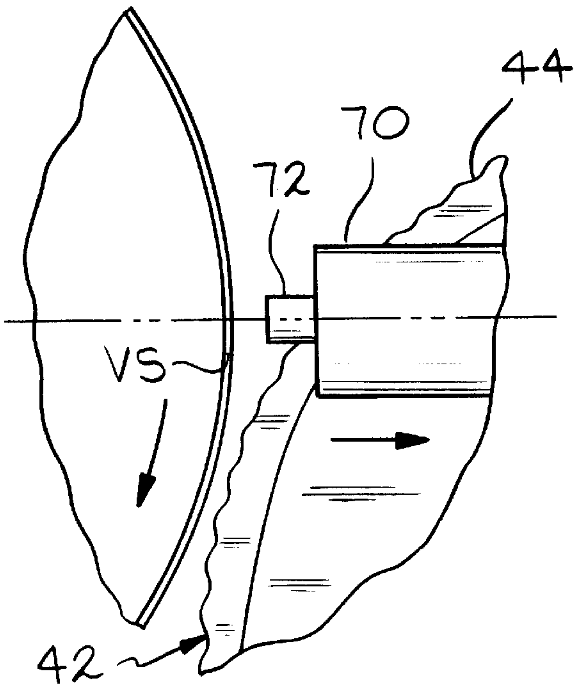
FIG. 5 is a top view of a portion of the container orienting apparatus as the container drive wheel is being moved from the first position to the second position.

The label applicator station 10 includes apparatus, indicated generally at 40, for orienting containers C relative to a vertically extending seam or the like. The container orienting apparatus 40 includes a container drive wheel 42 with a container gripping cover 44 (FIGS. 4 and 5) formed, preferably, of rubber and, especially, urethane rubber. As shown in FIGS. 4 and 5, the cover 44 may have an irregular outer surface to provide better gripping, relative to a container C.

The drive wheel 42 is rotatably mounted at a first end of a movable arm 46. A bracket 48 supports the arm 46 for pivotal movement about a pin 50. Movement of the arm is controlled, in a manner described below, by an electronic linear actuator 52 and a spring 53. The linear actuator 52 is preferably a solenoid linear actuator. The actuator 52 and the spring 53 are both connected to a second end of the arm 46 and to the bracket 48. Essentially, the arm 46 can be pivoted so that the drive wheel 42 is moved between a first position shown in FIGS. 1, 2 and 4 and a second position shown in FIG. 5. In the first position, the drive wheel 42 and, specifically, the drive wheel cover 44 engages a surface S of a container C carried in a pocket of the star wheels 26 and 27. In the second position, the drive wheel cover 44 does not engage the surface S of a container C. In the illustrated embodiment, the spring 53 biases the arm 46 toward the first position and maintains the arm 46 in the first position except when the actuator 52 is energized. The spring 53 is operable to hold the drive wheel 42 against a container C with enough force to provide a positive driving connection between the drive wheel cover 44 and the surface S of a container C. When the actuator 52 is energized, it pivots the arm 46 so that the drive wheel 42 is moved away from and out of driving connection with the surface S of a container C.

The drive wheel 42 is positively driven, in the illustrated embodiment, by a motor 50 through a flexible drive shaft 52. Rotation of the motor shaft (not shown) is transmitted to the drive wheel shaft 54 through the flexible drive shaft 52. In the illustrated embodiment, the motor 50 is fixed to a frame F of the label applicator station 10 and not supported on the arm 46. This results in the arm 46 having a lower inertia, and faster response, than if the motor 50 was mounted on the arm. The flexible drive shaft 52 accommodates relative movement between the motor 50 and the drive wheel 42 supported on the arm 46. Alternatively, a small motor (not shown) may be mounted directly on the arm 46, preferably with a direct (not shown) and not flexible drive connection with the drive wheel 42.

Figure 2:
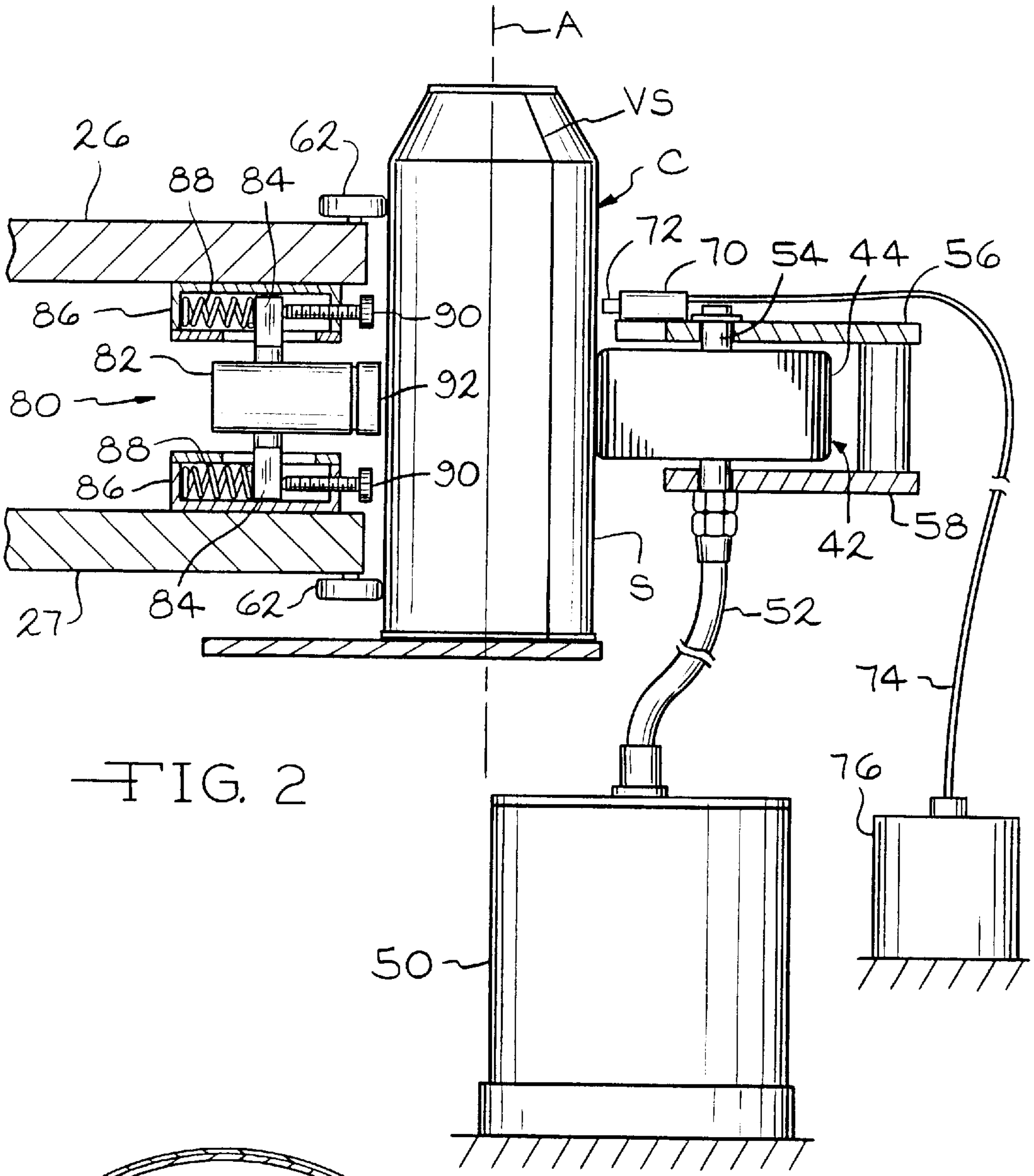
FIG. 2 is a partial cross-sectional view of the apparatus shown in FIG. 1, taken along the line 2—2 of FIG. 1.
Figure 3:
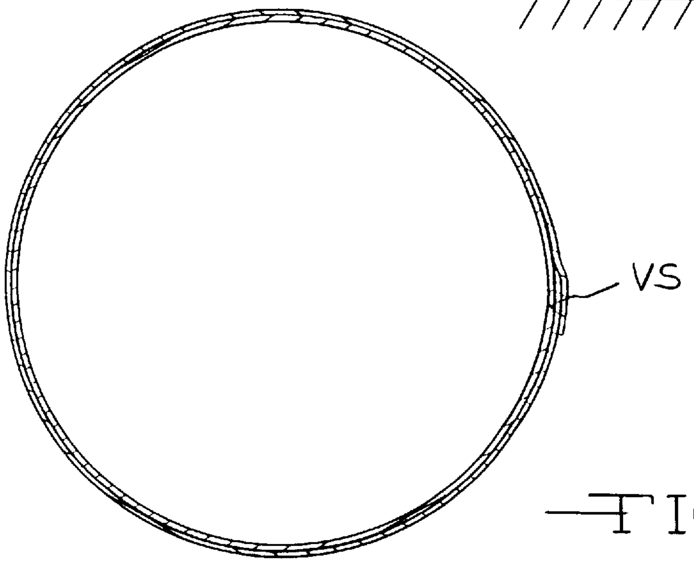
FIG. 3 is a cross-sectional view of a container with a label applied by labelling apparatus, after the container has been oriented by container orienting apparatus of the present invention.

As shown in FIG. 2, the drive wheel 42 is mounted on a shaft 54 which is rotatably supported by upper and lower brackets which are part of the arm 46. It is preferred that the shaft 54 be supported on the arm 46 so that the shaft 54 is parallel to an axis A of containers C carried in pockets of the star wheels 26 and 27.

Referring further to FIGS. 1 and 2, the upper and lower star wheels 26 and 27 have a plurality of container receiving pockets 60 and each pocket 60 of each star wheel 26 and 27 is provided with a pair of roller bearings 62. The rollers 62 extend beyond the pocket 60 so that they contact the surface S of a container C in the pocket 60. The roller bearings 62 prevent contact between a container C and the star wheels 26 and 27, while facilitating rotation of a container C in the pockets 60 of the star wheels 26 and 27. Although the roller bearings 62 are illustrated, for simplicity, as being positioned above the upper star wheel 26 and below the lower star wheel 27, it is preferred that the roller bearings mounted on the upper star wheel 26 be mounted on the lower side thereof and the roller bearings on the lower star wheel 27 be mounted on the upper side thereof. This arrangement would help protect the roller bearings from damage.

As shown in FIG. 2, the drive wheel 42 is positioned between the upper and lower star wheels 26 and 27 and between the roller bearings 62 carried on the star wheel 26 and the roller bearings 62 carried on the lower star wheel 27. As the star wheels 26 and 27 rotate, individual containers C are picked up in successive pockets 60 of the wheels 26 and 27. Further rotation of the star wheels 26 and 27 will bring the surface S of the container C into contact with the drive wheel 42 which, as discussed below in more detail, will be in the first position and will be rotating. The drive wheel 42 will press the container C against the two roller bearings 62 on the upper star wheel 26 and against the roller bearings 62 on the lower star wheel 27. This arrangement provides exceptional stability for the container C while it is held captive between the roller bearings 62 and the drive wheel 42. The path of the container C held by the drive wheel 42 in the pockets 60 of the rotating star wheels 26 and 27 is an arc, rather than a straight line. Since the arm 46 is pivotally supported on the bracket and biased by the spring so that the drive wheel 42 is urged towards the star wheels 26 and 27, contact between the drive wheel 42 and the container C can be maintained over a substantial portion of the arc. This zone of contact is long enough so that the container C can be rotated at least 360 degrees in the zone.

The rotating drive wheel 42 causes the container C to rotate until a vertically extending seam VS (FIGS. 2 through 5) reaches a predetermined angular orientation. At that time, as described below in further detail, the drive wheel 42 is moved from the first position to the second position and locking means engage the container C to prevent further rotation.

Referring now to FIGS. 1, 2, 4 and 5, an optical sensor 70 is mounted on the first end of the arm 46. An eye 72, which is part of the sensor 70, is supported on the arm 46 so that, when the arm 46 is supporting the drive wheel 42 in the first position, the eye 72 is positioned adjacent to the surface S of a container C carried in a pocket 60 of the star wheels 26 and 27, in the zone of contact. The sensor is preferably one which has sensitivity which can be adjusted. Excellent results have been obtained with the Q 19SN6FP fiber optic sensor eye with adjustable sensitivity. This sensor is commercially available from Banner Engineering. The sensor 70 is operable to generate a signal when a vertical seam VS of a rotating container C passes in front of the eye 72. This signal is relayed via a conduit 74 to a controller 76 which is operable to control the actuation of the linear actuator 52. Control signals are relayed from the controller 76 to the actuator 52 via a conduit 78.

A container locking mechanism, indicated generally at 80 in FIG. 2, comprises, in the preferred embodiment, a permanent magnet 82. Each pair of pockets 60 in the upper/lower star wheels 26 and 27 is provided with a permanent magnet 82. The magnet 82 is adjustably mounted on the star wheels 26 and 27 for movement towards and away from the pocket 60. A bracket 84 which is secured to the magnet 82 extends above and below the magnet 82 through slots in housings 86. The bracket 84 is held captive in the housings 86 between springs 88 and set screws 90. The set screws 90 can be adjusted to position a head 92 of the magnet 82 immediately adjacent to the surface S of a container carried in the pockets 60 of the star wheels 26 and 27. It is preferred that the head 92 of the magnet 82 not touch the surface S of a container C but that the two should be separated by a very small distance, preferably a few millimeters. The distance can be somewhat more or somewhat less, resulting in more or less force being exerted by the magnet head 92 on the container C, tending to resist rotation of the container C. As discussed below in more detail in connection with FIG. 6, more or less force can be accommodated within the apparatus, after an initial set-up. The permanent magnet is preferably a strong magnet. Good results have been achieved with a variety of magnets that are commercially available from Dura Magnetics. The magnet 82 is operable to exert a substantial force on the container C, provided that it is magnetic, which resists rotation of the container C about its axis. During the time that the drive wheel 42 is rotating the container C in the zone of contact, the drive wheel 42 overcomes the force exerted by the magnet 82. When the drive wheel is moved to the second position, the magnet 82 stops the container C from rotating and holds it in a predetermined angular orientation.

Operation of the labelling station 10 with the container orienting apparatus 40 will now be described. Containers C are advanced, from left to right in FIG. 1, on the conveyor 24 towards the star wheels 26 and 27. Individual containers C are picked up in pockets 60 of the star wheels 26 and 27 which rotates in a counter-clockwise direction, advancing the containers C towards the container orienting station 40. Once a container C reaches the zone of contact, the drive wheel 42 begins to rotate the container C. In the illustrated embodiment, the drive wheel rotates in a counter-clockwise direction (FIG. 1) and causes containers C to rotate in a clockwise direction. From the time a container C enters the star wheel pockets 60 until it is removed from the pockets 60 by the roll-on pad 28, the container will be subject to the magnetic force of the magnet head 92 associated with those pockets 60. This magnetic force will resist rotation of the container C until it is engaged by the drive wheel 42 in the zone of contact. The spring 53 will cause the drive wheel 42 to “ride” the surface S of a container C. The drive wheel 42 will continue to rotate the container C in the zone of contact until the sensor 70 detects the vertical seam VS or another visually discernible mark on the container C.

Referring now to FIG. 4, the container C has been rotated to a point where the sensor 70 detects the seam VS. The sensor 70 signals the controller 76 which, in turn, actuates the linear actuator 52 causing the drive wheel to move to the second position, shown in FIG. 5, where it no longer causes the container C to rotate. Once the drive wheel 42 disengages the surface S of the container C, the magnet head 92 becomes operable to stop rotation of the container C. The period of time it takes for the magnet head 92 to stop the container C from rotating depends upon several factors including, in no particular order, the rotational inertia of the container C including contents, if any, the strength of the magnet head 92, the iron content of the container C, the rotational speed imparted to the container by the drive wheel 42, and others. These factors, as well as the location of the sensor 70 determine, for a particular run of containers C, what angular orientation the containers C will have when the magnet head 92 stops the container C from rotating. A preferred embodiment including an adjustment bracket mounting for the sensor is described below with reference to FIG. 6. This provides a great deal of operator control over the ultimate angular orientation of the container C when it stops rotating. Once the container C stops rotating, the magnet head 92 holds the container C in the pockets 60 of the star wheels 26 and 27 in the angular orientation the container C had when it stopped rotating.

It will be appreciated that the star wheels 26 and 27 are synchronized with the other components of the labeling station 10 and, specifically, with the vacuum drum 22 and the label cutter 14. As a consequence, the leading edge of each pre-cut label 18 is applied to each container C at the same angular position relative to the star wheels 26 and 27. The container orienting apparatus 40 described above is operable to rotate each container to position the vertical seam or other visually perceptible mark on the container at that angular orientation relative to the star wheels 26 and 27.

During set-up of the apparatus 40, it may be determined that the containers C are being consistently rotated to the same, but undesired, angular orientation. As discussed above, this depends on many factors. In a preferred embodiment, shown in FIG. 6, an optical sensor 100 corresponding with sensor 70 (FIG. 4) is mounted on a bracket 102 which, in turn, is mounted on an arm 104 corresponding with the arm 46. The arm 104 is supported opposite a star wheel 106. The bracket 102 is slotted, permitting an operator to move the sensor 100 towards and away from the axis of a drive wheel 108, thereby affording control over the angular orientation of the container when the magnet (not shown in FIG. 6) stops the container C from rotating. The position of the sensor 100 for a given container run can be marked on the bracket 102 for future reference.

Figure 6:
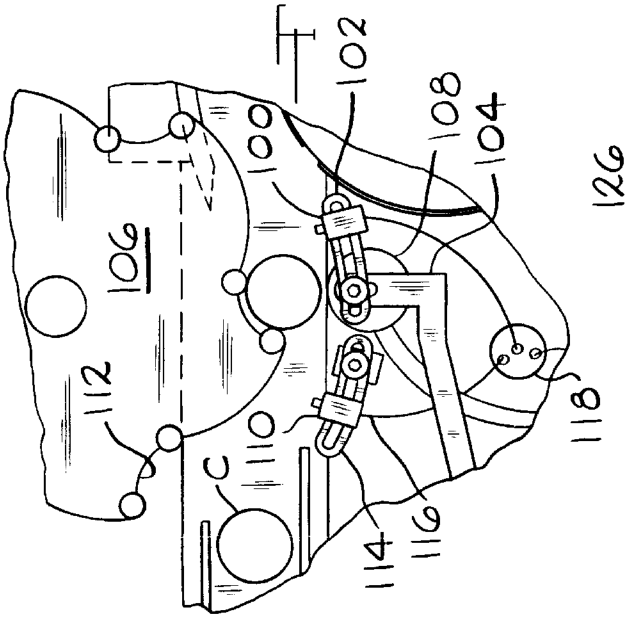
FIG. 6 is a top view of a modified version of a portion of the container orienting apparatus.

Also shown in FIG. 6 is a second sensor 110 which is operable to detect the presence (or absence) of a container C in a pocket 112 of the star wheel 106. The sensor 110 is mounted on a bracket 114 which also permits the sensor 110 to be moved towards and away from the drive wheel axis. This sensor 110 can be less sophisticated than sensors 70 and 100. The sensor 110 can be an SM312D which is available from Banner Engineering. This sensor is connected via line 116 to the controller 118 which, like controller 76, receives a signal from the controller 100 to withdraw the drive wheel 108 from a container C. The sensor 110 is operable to signal the controller 118 which, in turn, is operable to return the drive wheel 108 to a position where it engages the container C. The sensor 110 provides an efficient means for sensing the presence of a container C in the star wheel pocket 112 and signalling the controller to return the drive wheel 108 to the first position where it engages the container C. Conventional lock-out circuitry (not shown) may be provided in the controller 118 to prevent the actuation of the other components of the labelling apparatus.

Figure 7:
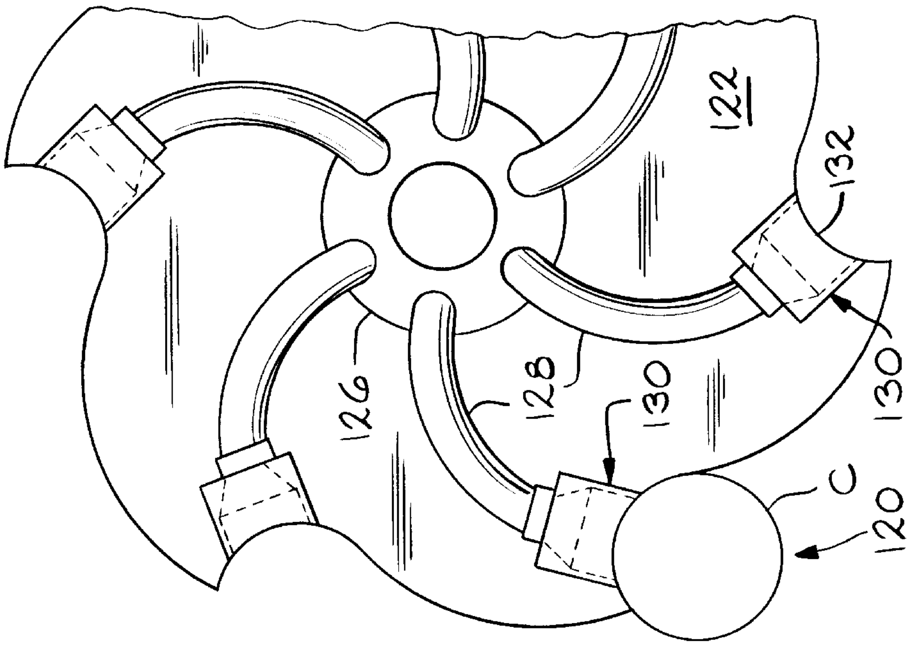
FIG. 7 is a top view of a vacuum container gripper mounted on a star wheel.
Figure 8:
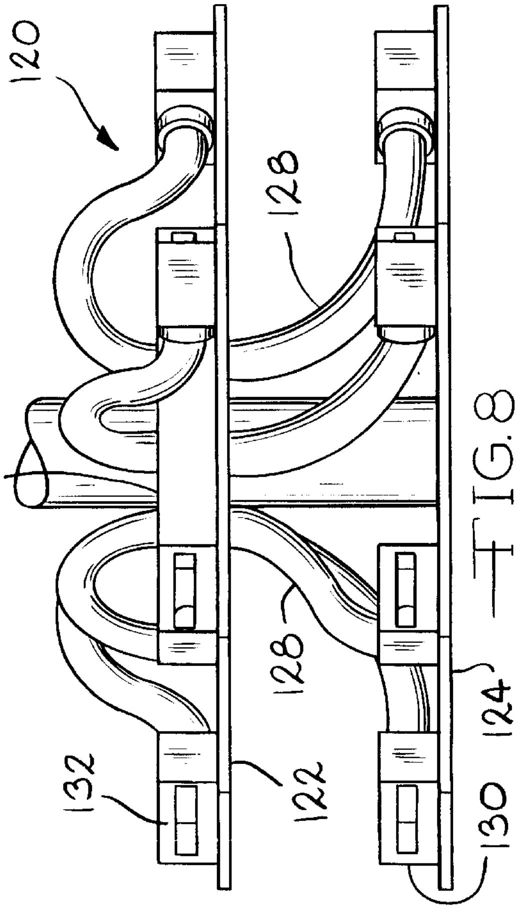
FIG. 8 is a side view of vacuum container grippers mounted in each pocket of upper and lower star wheels.

For applications which do not involve magnetic containers C, the apparatus described above can be modified. Specifically, the magnets 82 can be replaced by vacuum means, indicated generally at 120 in FIGS. 7 and 8, which are mounted on upper and lower star wheels 122 and 124. A source for vacuum is present in the form of a vacuum manifold 126, which is a standard piece of equipment in packing machinery. Vacuum hoses 128 connect the manifold 126 to vacuum terminals 130 which are configured to provide a sliding seal against the surface of a container. The terminals can be made of urethane for low friction and long life. As shown in FIG. 7, a sealing lip 132 formed on the terminal 130 conforms to the contour of the container C. Relatively low vacuum is need to provide a substantial force tending to stop a container from rotating. The sensors and the other elements of the previously described apparatus can be used with the vacuum means shown in FIGS. 7 and 8 so that the vacuum means are operable to stop rotation of containers at a predetermined angular orientation.

For a given application, the minimum length of the contact zone will be determined by the rate at which the drive wheel 42 rotates, the size of the containers and the rate at which the star wheels rotate. Stated differently, the contact zone must be long enough so that the drive wheel can rotate a container C 360 degrees before it leaves the contact zone. This ensures that the container can be rotated until the seam reaches the predetermined angular orientation.

It is contemplated that the magnets 82 associated with each star wheel pocket 60 may be replaced with electro-magnets (not shown). It is further contemplated that the electro-magnets could be energized at all times or selectively energized at the time of actuation of the linear actuator to move the drive wheel 42 from the first position to the second position and de-energized after the container C exits the star wheel pockets 60.

Although the present invention has been described in terms of specific embodiments, it is anticipated that alterations and modifications thereof will no doubt become apparent to those skilled in the art. It is intended that the appended claims be interpreted as covering all such alterations and modifications as fall within the true spirit and scope of the invention.

What is claimed is:

1. A method for orienting a magnetic container about a vertically extending seam or other visually discernible marking carried by the container, said method comprising the steps of positioning the container in a pocket of a star wheel, adjacent to a magnet which is operable to exert on the container, so long as it is in the pocket of the star wheel a magnetic force which resists rotation of the container, engaging a surface of the container with a drive wheel operable to overcome the container rotation resistance of the magnet and to rotate the container in the pocket of the star wheel, scanning the surface of the container, while it is rotating, with a sensor operable to detect the seam or other visually discernible marking, when it passes by the sensor, and further operable to generate a signal in response thereto, and disengaging the drive wheel from the surface of the rotating container in response to the signal whereby, after the drive wheel is disengaged from the container surface, the magnetic force stops the rotation of the container in a pre-determined orientation and maintains the container in that orientation.

2. The method claimed in claim 1 wherein the magnet is an electro-magnet.

3. Apparatus for orienting a magnetic container relative to a vertically extending seam or other visually discernible marking carried by the container, said apparatus comprising a star wheel with a pocket for receiving a randomly oriented container, a magnet supported on said star wheel, adjacent to said pocket and operable to exert a magnetic force on a container so long as it is in said pocket, which force resists rotation of the container, a drive wheel supported for movement between a first position where it is operable and a second position where it is inoperable to overcome the container rotation resistance of said magnet and to rotate a container in said pocket of said star wheel, a first sensor operable to scan a surface of the container, while it is rotating in said star wheel pocket, said first sensor being further operable to detect the seam or other visually discernible marking, when it passes by the sensor, and, further operable to generate a signal in response thereto, and an actuator operable to move said drive wheel from said first position to said second position in response to the signal whereby, when said drive wheel is in said second position, the magnetic force of said magnet on the container causes it to stop rotating in a pre-determined angular orientation in said pocket of said star wheel and prevents, thereafter, the container from rotating in said pocket of said star wheel.

4. The apparatus claimed in claim 3 wherein said magnet is an electro-magnet.

5. The apparatus claimed in claim 3 which further comprises a second sensor operable to detect the presence or absence of a container in said pocket of said star wheel.

6. The apparatus claimed in claim 3 which further comprises means for adjusting the position of said first sensor relative to the axis of said drive wheel.

7. The apparatus claimed in claim 3 which further comprises a pair of roller bearings mounted relative to each pocket of said star wheel for engaging the surface of a container in said star wheel pocket.

8. Apparatus for orienting a container relative to a vertically extending seam or other visually discernible marking carried by the container, said apparatus comprising a star wheel with a pocket for receiving a randomly oriented container, a vacuum terminal supported on said star wheel, adjacent to said pocket and operable to exert a force on a whenever it is container in said pocket, which force resists rotation of the container, a drive wheel supported for movement between a first position where it is operable and a second position where it is inoperable to overcome the container rotation resistance of said vacuum terminal and to rotate a container in said pocket of said star wheel, a first sensor operable to scan a surface of the container, while it is rotating in said star wheel pocket, said first sensor being further operable to detect the seam or other visually discernible marking, when it passes by the sensor, and, further operable to generate a signal in response thereto, and an actuator operable to move said drive wheel from said first position to said second position in response to the signal whereby, when said drive wheel is in said second position, the force of said vacuum inlet on the container causes it to stop rotating in a pre-determined angular orientation in said pocket of said star wheel and prevents, thereafter, the container from rotating in said pocket of said star wheel.

9. The apparatus claimed in claim 8 which further comprises a second sensor operable to detect the presence or absence of a container in said pocket of said star wheel.

10. The apparatus claimed in claim 8 which further comprises means for adjusting the position of said first sensor relative to the axis of said drive wheel.

11. The apparatus claimed in claim 8 which further comprises a pair of roller bearings mounted relative to each pocket of said star wheel for engaging the surface of a container in said star wheel pocket.

12. A method for orienting a container about a vertically extending seam or other visually discernible marking carried by the container, said method comprising the steps of positioning the container in a pocket of a star wheel, adjacent to a vacuum terminal which is operable to exert on the container, whenever it is in the pocket of the star wheel, a force which resists rotation of the container, engaging a surface of the container with a drive wheel operable to overcome the container rotation resistance of the vacuum terminal and to rotate the container in the pocket of the star wheel, scanning the surface of the container, while it is rotating, with a sensor operable to detect the seam or other visually discernible marking, when it passes by the sensor, and further operable to generate a signal in response thereto, and disengaging the drive wheel from the surface of the rotating container in response to the signal, whereby, after the drive wheel is disengaged from the container surface, the force exerted on the container by the vacuum terminal stops the container from rotating when it is in a pre-determined orientation and maintains the container in that orientation.

13. The method claimed in claim 12 wherein the magnet is an electro-magnet.

* * * * *

UNITED STATES PATENT AND TRADEMARK OFFICE

CERTIFICATE OF CORRECTION

PATENT NO. : 5,810,955
DATED : September 22, 1998
INVENTOR(S) : Donald P. Seifert et al It is certified that error appears in the above-identified patent and that said Letters Patent is hereby corrected as shown below:

Column 8 Line 52 should read:
container whenever it is in said pocket, which force Signed and Sealed this Eleventh Day of May, 1999

*Attest:*

Q. TODD DICKINSON

*Attesting Officer*

*Acting Commissioner of Patents and Trademarks*